United States Patent [19]

Easterly

[11] 4,453,581
[45] Jun. 12, 1984

[54] TIRE AND WHEEL ASSEMBLY WITH A SHIELD FOR TIRE FLAPS

[76] Inventor: Herbert Easterly, P.O. Box 767, Crossville, Tenn. 38555

[21] Appl. No.: 487,181

[22] Filed: Apr. 21, 1983

Related U.S. Application Data

[63] Continuation of Ser. No. 217,710, Dec. 18, 1980, abandoned.

[51] Int. Cl.³ .............................................. B60C 5/00
[52] U.S. Cl. .................................. 152/349; 152/365; 152/427; 152/428
[58] Field of Search ............... 152/365, 366, 363, 364, 152/349, 350, 427, 428, DIG. 13

[56] References Cited

U.S. PATENT DOCUMENTS

| | | | |
|---|---|---|---|
| 1,583,878 | 5/1926 | Hall ....................................... | 152/372 |
| 1,658,646 | 12/1928 | Michelin ............................. | 152/365 |
| 2,580,343 | 12/1951 | Benoit .................................. | 152/427 |
| 2,773,535 | 12/1956 | Tolonen ............................. | 152/365 |
| 2,968,206 | 1/1961 | Omoto .................... | 152/DIG. 13 X |
| 3,077,220 | 2/1963 | Fusco, Jr. ............................ | 152/427 |
| 3,106,953 | 10/1963 | Baxa ..................................... | 152/427 |
| 3,533,461 | 10/1970 | Boileau ............................... | 152/365 |
| 4,063,584 | 12/1977 | Takigawa ............................ | 152/365 |

FOREIGN PATENT DOCUMENTS

| | | |
|---|---|---|
| 2315568 | 10/1973 | Fed. Rep. of Germany . |
| 2300659 | 7/1974 | Fed. Rep. of Germany . |
| 950116 | 2/1964 | United Kingdom . |
| 1084837 | 9/1967 | United Kingdom . |
| 1149705 | 4/1969 | United Kingdom . |

*Primary Examiner*—William A. Powell
*Assistant Examiner*—Thomas Bokan
*Attorney, Agent, or Firm*—Barnes & Thornburg

[57] ABSTRACT

A tire and wheel assembly comprises a wheel rim, a tire and an inner tube having a valve stem, an opening in the wheel rim for receiving the valve stem, a flap disposed between the wheel rim and the inner tube, and a reusable shield interposed between the flap and the wheel rim in proximity to the rim opening to prevent exposure of the flap through the rim opening. The shield includes a relatively small opening for snugly receiving the valve stem, has a size sufficient to completely cover the rim opening, and is constructed of a resilient material which is resistant to deterioration when exposed to substances such as grease, oil, and road salts.

3 Claims, 3 Drawing Figures

TIRE AND WHEEL ASSEMBLY WITH A SHIELD FOR TIRE FLAPS

This is a continuation of application Ser. No. 217,710, filed Dec. 18, 1980, abandoned.

BACKGROUND OF THE INVENTION

This invention relates to tire assemblies and, more particularly, to a shield which is removably interposed between the tire rim and tire flap to prevent flap wear and tire blowouts.

Over the years, various improvements have been made to vehicle tires. These improvements have been directed primarily toward increasing the useful life of tires and reducing or eliminating operational tire failures such as blowouts, punctures, ply separations, and the like, thereby improving the safety of vehicular operation.

One area in which improvements have been directed is in the prevention of inner tube failure caused by the tube's interaction with the rim. For example, the invention disclosed in U.S. Pat. No. 1,658,646 sought to reduce inner tube failures through the use of an improved tire flap.

In recent years, there has been a reduction in the use of inner tubes for tires on light-duty vehicles, such as passenger cars. As a result, the largest present use of inner tubes in tires is in heavy-duty applications such as trucks, buses, and semi-trailers. Many of the recent developments in the art have been directed toward these applications. U.S. Pat. Nos. 3,533,461 and 4,063,584 both disclose tire flaps for heavy-duty vehicles which include improvements for reducing the wear on the inner tubes caused by the squeezing or pinching of the tubes between the flap and the tire of the wheel assembly. U.S. Pat. No. 2,773,535 discloses a metal plate which is incorporated and embedded in the tire flap during molding to reinforce the flap adjacent to the valve stem opening and to provide a rigid seat for the flanged end of the valve stem so as to prevent undesirable cocking and distortion of the valve stem.

Other devices have been added to fix the position of the valve stem, or to prevent the stem from being drawn into the tire when the inner tube deflates. Among these devices are those disclosed in U.S. Pat. Nos. 2,580,343; 2,968,206; 3,106,953; and 3,077,220.

Recent developments have significantly affected heavy-duty vehicular operations. These changes have at least indirectly helped create some of the problems which the present invention solves. Many states now permit trucks and other heavy-duty vehicles weighing up to 80,000 pounds gross to operate on the roads. Operators of these heavy-duty vehicles are also now inflating their tires to pressures in the range of 100–110 psi, since it has been shown that higher tire pressures conserve increasingly expensive fuel and extend the useful life of costly tires.

Increased loads, and increased tire pressures has resulted in tire failure from sources not often encountered with lighter loads, and lower pressures. In particular, the pressure now exerted by the inner tube against the tire flap tends to force portions of the tire flap through the valve stem opening in the wheel rim. This deformation eventually causes the tire flap to either wear thin or crack around the valve stem opening in the flap. The weakening of the tire flap results in stress being placed upon the inner tube, which, if the tire flap is not replaced, will ultimately result in failure and deflation of the inner tube. Besides the obvious safety hazards presented by a deflating tire during the operation of a heavy-duty vehicle, the tire itself may be destroyed. When a tube tire on a moving vehicle is suddenly deflated, an extremely large force is exerted upon the inner tube valve stem before the vehicle can be brought to a stop. Frequently, this force is great enough to draw the valve stem inwardly through the valve stem opening into the tire. Not only can this damage the valve stem, but the presence of the valve stem within the tire often damages the tire and the inner tube beyond repair before the vehicle can be brought to a halt.

Another way in which tire flaps can be damaged is through exposure to water, road salts, greases, oils, and road chemicals which weakens the rubber material of the flaps, and eventually causes them to deteriorate and break or crack. The flaps are protected in large part from these elements by the wheel rim. However, most wheel rims for heavy-duty vehicles have an elongated slot which is typically about 0.750 inch (1.905 cm) wide and 3.75 inches (9.525 cm) long for receiving the valve stem of the inner tube, leaving an unprotected area of the flap around the valve stem.

Standard industry practice is to reuse tire flaps a number of times. Because most of the tire flap is hidden from view, it is usually difficult to determine when the flap is wearing out, unless the tire is removed from the rim. Therefore, too often, tire flaps are not replaced before they have been damaged or become worn to the point where the inner tube ruptures and deflates.

Because of the number of flaps, inner tubes, and rims currently in use, it would be both impractical, wasteful, and extremely expensive to rectify the above-described problems by discarding viable present components and replacing them with improved components. It would be preferable to alleviate these problems with a device which is inexpensive, easy to install, and readily adapted to be used with equipment presently in service.

SUMMARY OF THE INVENTION

It is therefore an object of this invention to provide a reusable shield which may be interposed between the tire flap and the wheel rim to prevent deformation of the tire flap into the elongated valve stem opening in the wheel rim.

It is another object of this invention to provide a shield for protecting the tire flap from damage due to the corrosive effect of water, road salts, greases, oils, and other road chemicals which would otherwise contact the flap through the valve stem opening in the wheel rim.

It is a further object of this invention to provide a means for preventing the valve stem from being drawn into the tire casing through the valve stem opening in the rim when the inner tube is deflated.

It is also an object of this invention to provide a shield which is inexpensive, easy to install, and readily adaptable to tire flaps and wheel assemblies presently in use.

The present invention is used in connection with a tire and wheel assembly which includes a flanged rim having an elongated opening for receiving the valve stem of an inner tube. Mounted on the rim is a tire, a tire flap containing a valve stem opening aligned with the opening in the rim, and an inner tube lying within the space bounded by the tire and tire flap. A shield is interposed between the rim and the flap in proximity to the valve stem openings in the flap and the rim. The shield includes an opening sized and shaped to receive snugly the valve stem inserted therethrough.

The invention will best be understood by reference to the appended drawings forming a part of this specification and which illustrate a preferred embodiment thereof, wherein:

DESCRIPTION OF THE PREFERRED EMBODIMENT

Figure 1:
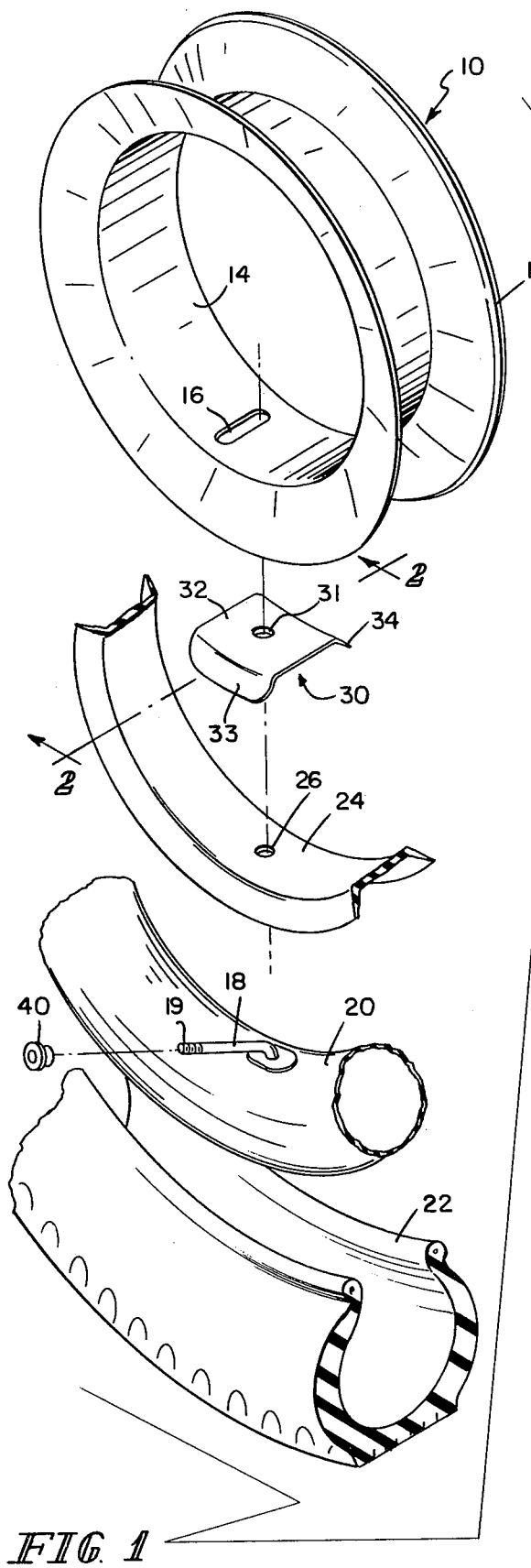
FIG. 1 is an exploded view of a tire and wheel assembly, with all parts shown in their proper relationship.
Figure 2:
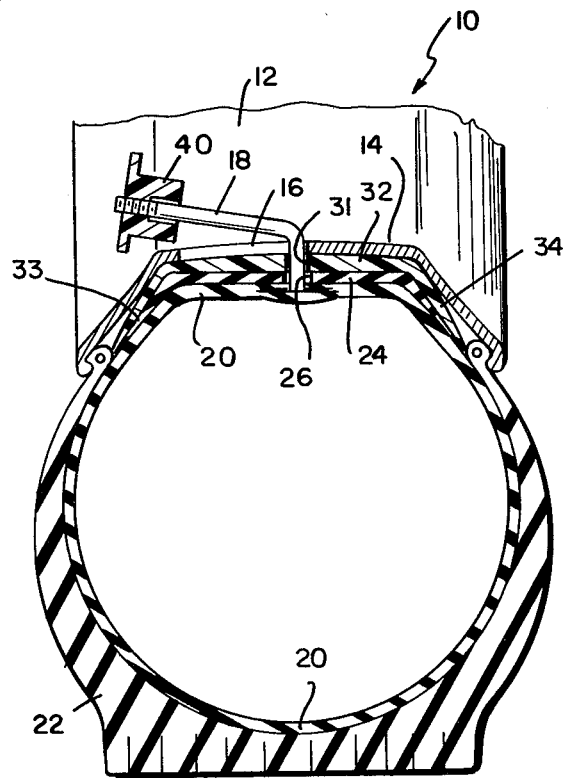
FIG. 2 is a sectional view taken generally along section lines 2—2 of FIG. 1.

Referring now to FIGS. 1 and 2, a typical tube tire and wheel assembly 10 includes a wheel rim 12 having a cylindrical center section 14 which includes an elongated slot or opening 16 for receiving the valve stem 18 of an inner tube 20. In most assemblies 10 used on heavy-duty vehicles, the center section 14 is 8 inches (20.32 cm) wide and the opening 16 is 3.75 inches (9.525 cm) long and 0.750 inch (1.905 cm) wide.

The valve stem 18 includes at its distal end a threaded opening with air valve 19, through which air is introduced into the inner tube 20. The tube 20 is inserted into a tire 22 which is in turn mounted upon the rim 12 and the tube 20 is inflated to a sufficient air pressure. An inner flap 24 is positioned between the tube 20 and the cylindrical center portion 14 of the rim 12 to protect and provide support for the tube 20 against the rim 12. The flap 24 includes an aperture 26 which is substantially smaller than the elongated slot or opening 16 provided in the wheel rim 12 for receiving the valve stem 18 of the tube 20. Because of the size of the elongated slot or opening 16 in the rim 12, a portion of the flap 24 in proximity to the valve stem 18 of the inner tube 20 is exposed through the valve stem opening 16 in the wheel rim 12. The flap 24 is typically constructed of a rubber material. Heretofore, with the exposure to water, road salts, greases, oils, and other road chemicals through the slot 16, these flaps 24 have deteriorated and worn so that they eventually cannot withstand the tire pressure.

Figure 3:
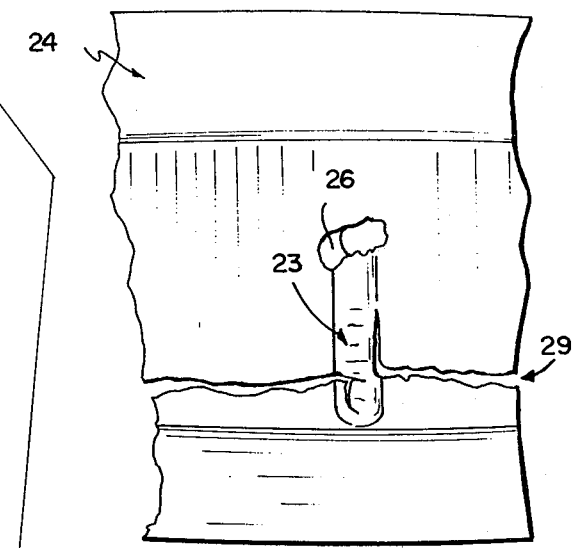
FIG. 3 is a top plan view of a tire flap showing damage and deterioration which has heretofore occurrred in tire and wheel assemblies.

As shown in FIG. 3, the flap 24 may become so weak that the air pressure within the tube 20 forces a portion 23 of the flap 24 into the opening 16. As the flap 24 becomes weaker and weaker through exposure to the elements, the tube 20 projects further and further into the opening 16 until finally the portion 23 of the flap 24 in proximity to the valve openings 16 and 26 ruptures due to the internal air pressure in the tube 20. The rupture of the flap 24 may in turn rub or pinch the tube 20 and cause it to deflate. This rupture and eventual deflation of the tube 20 may either be gradual or in some instances rapid to create a blowout and a hazardous driving condition. Further, when the flap 24 ruptures and tube 20 deflates, the stem 18 may be drawn into the tire 22 through the elongated opening 16 and the aperture 26 in the flap 24. When this happens, the stem 18 usually gouges the interior of the tire 22 so that the tire 22 is many times destroyed.

Another way in which the flap 24 may be rendered unusable is the development of cracks 29 in the flaps 24 around the weakened portion 23 of the flap 24 in proximity to the valve openings 16 and 26. The weakening of the portion 23 of the flap 24 is produced by either the high air pressure in the tube 20, exposure to water, road salts, greases, oils, and road chemicals which are introduced to the flap through the opening 16, or a combination of both of these factors. The exposure of the area 23 to the outside elements serves to speed up the processes which result in flap 24 rupture and cracking.

Referring back to FIGS. 1 and 2, the improved tire and wheel assembly 10 of the present invention includes a shield 30 having an aperture 31. The shield 30 is interposed between the flap 24 and the cylindrical center portion 14 of the wheel rim 12 in proximity to the opening 16. The shield 30 is an oblong sheet of plastic or other resilient material which is not affected by exposure to elements such as water, road salt, greases, oils, and other road chemicals, and which is strong enough to resist deformation due to tire pressure. In a preferred embodiment, the shield 30 contains a contoured center portion 32, which fits flush against the center portion 14 of the rim 12 and the tire flap 24. The shield 30 further includes flanges 33, 34 on either side of the center portion 32 which fit flush against the flanges of the wheel rim 12 and the tire flap 24 in proximity to the valve stem openings 26, 16. The flanges 33, 34 of the shield 30 serve to position and prevent the shield 30 from rotating about the valve stem 18 relative to the flap 24. The shield 30 covers the area 23 of the flap 24 in proximity to the valve stem openings 16, 26 to shield the area 23 from exterior elements and also prevent the flap 24 and tube 20 from projecting through the opening 16 in response to internal tire pressure. The shield 30 therefore serves to cover the valve stem opening 16 in the wheel rim 20. The shield 30 of the present invention is constructed as a unit separately from the tire flap 24 so that it is reusable and removable independently of other components of the tire and wheel assembly 10. A new shield 30 may be inserted at any time, without necessitating a change of any of the other components of the tire and wheel assembly 10 or may be repeatedly used even though the tire flap 24 or other components of the tire and wheel assembly 10 are changed.

The use of shield 30 permits a conventional valve stem cap 40, when screwed to air valve 19 of valve stem 18, to prevent the stem 18 from being drawn into the interior of the tire 22 when the tube 20 is deflating during operation of the vehicle. This feature prevents the stem 18 from gouging or causing other serious damage to the tire 22 when a blowout occurs.

Further, since the shield 30 is fabricated from a lightweight resilient material, the addition of the shield 30 to a tire and wheel assembly 10 does not create an imbalance problem.

What is claimed is:

1. In a tire and wheel assembly of the type including a wheel rim, a tire and an inner tube having a valve stem projecting through the wheel rim, an elongated opening in the wheel rim for receiving the valve stem, and a flap disposed between the wheel rim and the inner tube to provide protection for the inner tube surface adjacent the wheel rim, the flap including a central portion and side portions, the improvement comprising a shield interposed between the flap and the wheel rim, completely covering the opening in the wheel rim to shield the flap from exposure to exterior substances such as grease and oil through the opening, the shield being constructed of a lightweight material which resists deterioration when exposed to the substances such as grease and oil, the shield including a central portion and flanges extending over the side portions of the flap in proximity to the rim opening, the shield having a width such that its flanges extend at least partially along the side portions of the flap to protect the side portions and prevent rotation of the shield about the valve stem, and the central portion of the shield including a relatively small opening for snugly receiving the valve stem.

2. The improvement as recited in claim 1 wherein the shield includes a slightly contoured central portion which conforms transversely and circumferentially to the contour of the wheel rim so that the shield fits flush against the wheel rim and flap in proximity to the rim opening.

3. In a tire and wheel assembly of the type including a wheel rim, a tire and an inner tube having a valve stem projecting through the wheel rim, an elongated opening in the wheel rim for receiving the valve stem, and a flap disposed between the wheel rim and the inner tube to provide protection for the inner tube surface adjacent the wheel rim, the flap being constructed of a rubber material which is subject to deterioration when exposed to substances such as grease and oil through the opening in the wheel rim, the improvement comprising a contoured plate interposed between the flap and the wheel rim, the plate being constructed of a lightweight material which resists deterioration when exposed to substances such as grease and oil and completely covering the opening in the wheel rim to shield the flap from exposure to such substances through the opening, the plate including a central portion and flanges extending outwardly therefrom, the plate having a width which is at least as wide as the width of the flap so that the flanges of the plate extend to the edges of the flap to cover and protect side portions of the flap in proximity to the rim opening, the central portion of the plate being contoured in both transverse and circumferential directions of the wheel rim so that the plate fits flush against the wheel rim and flap in proximity to the rim opening, and the central portion including a relatively small opening for snugly receiving the valve stem.

* * * * *